UNITED STATES PATENT OFFICE.

LUCIEN JEAN JOSEPH PERRUCHE, OF ST.-GERVAIS, FRANCE.

PROCESS FOR THE PRODUCTION OF NITRO COMPOUNDS.

1,325,168. Specification of Letters Patent. Patented Dec. 16, 1919.

No Drawing. Application filed August 19, 1918. Serial No. 250,547.

*To all whom it may concern:*

Be it known that I, LUCIEN JEAN JOSEPH PERRUCHE, citizen of the Republic of France, and resident of St.-Gervais, France (post-office address, 16 Rue des Coutures,) have invented a new and useful Process for the Production of Nitro Compounds, which improvements are fully set forth in the following specification.

The object of the present invention is a process for the production of aromatic nitro compounds and consists in passing oxygen, ozonized air or air under pressure into a mixture of the substance to be nitrated, with liquid nitrogen peroxid and traces of water under cooling.

In the presence of oxygen under these conditions nitrogen peroxid yields nitric acid *in statu nascendi*, according to the following equation

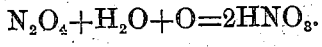

This nascent nitric acid reacts on the substance to be nitrated, furnishing a nitro compound and water, which latter in turn reacts with a fresh amount of nitrogen peroxid and oxygen with formation of nitric acid, the cycle of operations being repeated.

The final product consists of a mixture of nitro compound, nitric acid—equivalent to the water set free by the nitration—and an excess of nitrogen peroxid. The nitrogen peroxid is removed by distillation or by a current of air, leaving a mixture of the nitro compound and of nitric acid. The nitro compound may be separated by any suitable method, or the mixture of nitric acid and the nitro compound may be used for the production of polynitro products, by the action of sulfuric acid, for instance on the mixture such as it is or after the addition of a further quantity of the substance to be nitrated.

*Example 1.*

The production of nitrobenzene or of metadinitrobenzene.—100 parts by weight of liquid nitrogen peroxid, 50 parts of benzene and .5 parts of water are placed in an autoclave and thoroughly stirred; thereupon oxygen is introduced while maintaining a pressure of about 4 kilograms per sq. cm. and the mixture is carefully cooled between 0° and +20° C. By the end of 6 to 10 hours the operation is completed, the excess of nitrogen peroxid is removed by distillation or by the action of a current of hot air, and a mixture of nitrobenzene and nitric acid remains. The nitric acid can be neutralized by saturation with a base such as lime, ammonia and the like which gives the corresponding nitrate, the nitrobenzene being recovered in a pure state by distillation with or without steam. The mixture may also be extracted with carbon tetrachlorid, the nitrobenzene being separated by evaporating the solvent.

The mixture of nitric acid and nitrobenzene may also be treated with sulfuric acid, heated and precipitated by water in order to produce dinitrobenzene.

This operation can be effected in the presence of oxygen at ordinary pressure, the only purpose of using higher pressure being to accelerate the reaction. When air is used, however, the reaction must be carried out under pressure.

*Example 2.*

Production of ortho and para nitroanisol.—10 parts by weight of anisol dissolved in 50 parts of carbon tetrachlorid are poured into an autoclave. (The carbon tetrachlorid is used to moderate the violence of the reaction). Thereupon, the mixture being kept cooled between 0° and +20° C., 50 parts of liquid nitrogen peroxid are added, followed by treatment with compressed air or oxygen at about 5 kilos. per sq. cm. during about 20 hours. The pressure may be varied; the higher the pressure the more rapid the reaction.

The excess of nitrogen peroxid is removed by distillation or by means of a current of hot air, and in order to separate the nitroanisol the mixture is treated either with water or a base or additional carbon tetrachlorid. The nitroanisol consists of a mixture of orthonitroanisol and paranitroanisol which are separated by the usual methods. Under these conditions about 30% ortho and 70% para product are obtained.

What I claim as new and desire to secure by Letters Patent of the United States is:—

1. In a process of producing aromatic nitro compounds, the herein described steps of mixing the substance to be nitrated with liquid nitrogen peroxid; passing an oxidizing agent into the mixture; and cooling it.

2. In a process of producing aromatic nitro compounds, the herein described steps of mixing the substance to be nitrated with liquid nitrogen peroxid and traces of water; and then passing an oxidizing agent into the mixture.

3. In a process of producing aromatic nitro compounds, the herein described steps of mixing the substance to be nitrated with liquid nitrogen peroxid and traces of water; and then passing an oxidizing agent into the mixture while maintaining it under pressure.

4. In a process of producing aromatic nitro compounds, the herein described steps of mixing the substance to be nitrated with liquid nitrogen peroxid; passing an oxidizing agent into the mixture; and then removing the excess nitrogen peroxid, leaving a mixture of nitric acid and a nitro compound.

5. In a process of producing aromatic nitro compounds, the herein described steps of mixing the substance to be nitrated with liquid nitrogen peroxid and traces of water; passing an oxidizing agent into the mixture; cooling the mixture; and then removing the excess nitrogen peroxid, leaving a mixture of nitric acid and a nitro compound.

In testimony whereof I have signed this specification in the presence of a subscribing witness.

LUCIEN JEAN JOSEPH PERRUCHE.

Witness:
JOHN F. SIMONS.